United States Patent [19]

Long

[11] Patent Number: 4,512,102
[45] Date of Patent: Apr. 23, 1985

[54] ANIMAL AND INSECT EXTERMINATOR

[76] Inventor: Stanley E. Long, 52 Edna, Pontiac, Mich. 48053

[21] Appl. No.: 406,292

[22] Filed: Aug. 9, 1982

[51] Int. Cl.$^3$ ............................................ A01M 27/00
[52] U.S. Cl. ........................................................ 43/84
[58] Field of Search ............................. 43/80, 84, 124; 42/1 TB

[56] References Cited

U.S. PATENT DOCUMENTS

| | | |
|---|---|---|
| 951,119 | 3/1910 | Hitt . |
| 968,330 | 8/1910 | Rose . |
| 1,292,624 | 1/1919 | Magness . |
| 1,646,767 | 10/1927 | Schille . |
| 1,727,457 | 9/1929 | Meter . |
| 1,759,033 | 5/1930 | Beck . |
| 1,884,721 | 10/1932 | Karr ................................ 43/84 |
| 2,145,488 | 1/1939 | Marlman ........................ 43/84 |
| 2,512,252 | 6/1950 | Lehn ............................... 43/84 |
| 2,575,515 | 11/1951 | Graybill ......................... 43/84 |
| 2,654,178 | 10/1953 | Graybill ......................... 43/84 |
| 2,691,844 | 10/1954 | Smith ............................. 43/84 |
| 2,783,581 | 3/1957 | Lee ................................ 43/124 |
| 3,340,645 | 9/1967 | Poteet ............................ 43/84 |
| 3,550,542 | 12/1970 | Hollis ............................ 111/95 |
| 4,005,976 | 2/1977 | Rombach et al. ............... 431/13 |

Primary Examiner—Nicholas P. Godici
Assistant Examiner—M. Jordan
Attorney, Agent, or Firm—Basile, Weintraub & Hanlon

[57] ABSTRACT

An animal and insect exterminator for burrowing-type animals and insects. The exterminator includes an elongated tubular member which is adapted to be inserted within an underground burrow or nest. A shatterable tip member is replaceably mounted on one end of the tubular member and includes an explosive charge, such as jellied methanol or black powder. A detonator is carried by the tubular member for detonating the explosive charge so as to shatter the tip member and propel fragments of the tip member throughout the underground burrow or nest. The detonator includes a primer which is mounted within the tip member in proximity with the explosive charge and a trigger which forceably engages the primer to detonate the primer.

5 Claims, 4 Drawing Figures

U.S. Patent    Apr. 23, 1985    4,512,102
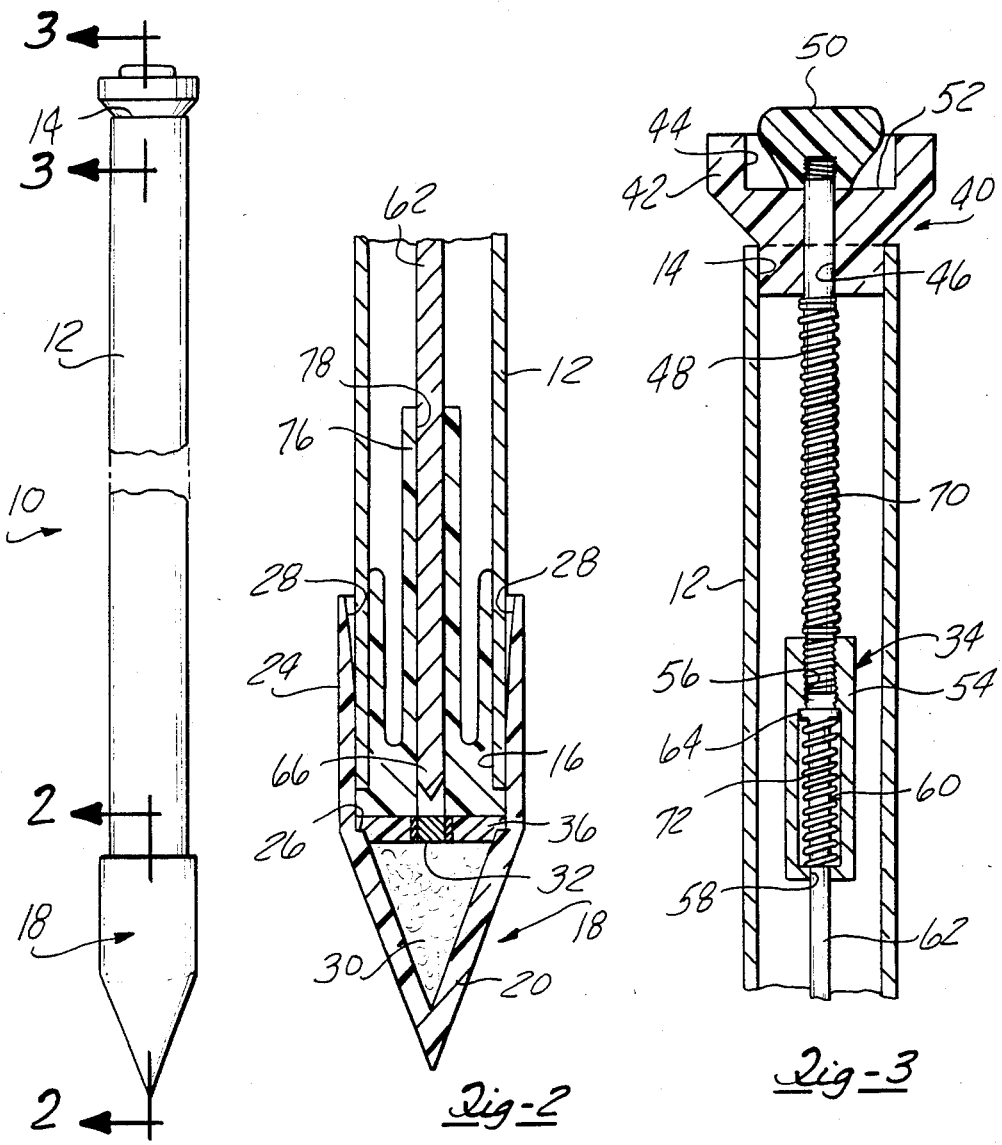
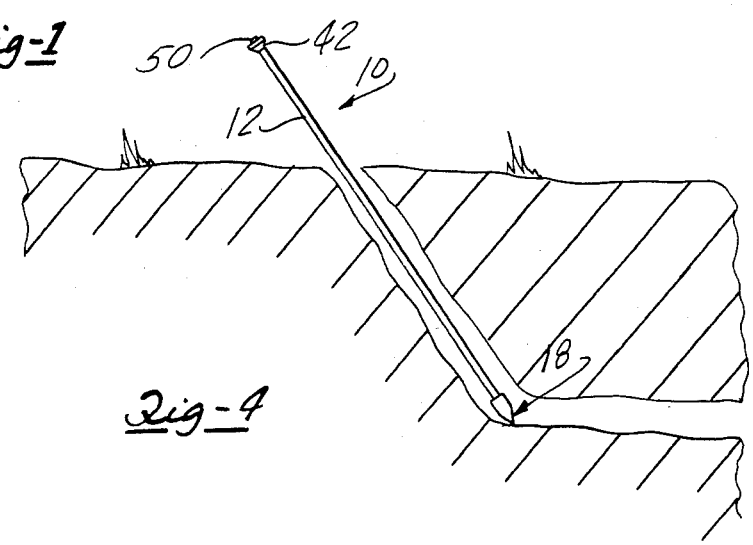

ANIMAL AND INSECT EXTERMINATOR

BACKGROUND OF THE INVENTION

1. Field of the Invention:

This invention relates, in general, to animal and insect exterminators and, more specifically, to exterminators for burrowing-type animals, such as rabbits, gophers, prairie dogs, rats, etc., and insects which build underground nests such as ants, termites, hornets, etc.

2. Description of the Prior Art:

Various types of exterminating devices and methods have been devised for killing animals and insects and, in particular, burrowing-type animals and insects. Such exterminator devices typically employ some type poison which is deposited within the burrow or underground nest. The poison may be employed in a solid form to be eaten by the animals or insects or may be applied in a gaseous form which is forcibly injected into the underground nest or burrow in order to permeate the entire burrow or nest with the poisonous gas.

However, such devices and methods have dangerous side effects which renderes them less than desirable or effective and has limited their widespread use. The use of poisonous compounds clearly presents a danger of affecting or harming nearby people and other animals if they are accidentally exposed to the poison. Also, such poisonous compounds may have adverse effects on plants, crops, etc. if used nearby.

Furthermore, such previously devised exterminators have not proven completely effective at killing all animals and insects within a burrow or nest. Such underground burrows or nests are typically large and include many twisting passages. Thus, a solid poisonous compound deposited at one entrance to the burrow or nest would not be encountered by all the animals or insects and can be easily avoided due to the existence of one or more additional entrances to the burrow or nest. In addition, the poisonous fumes which may be injected into the nest require a constant airflow to permeate the entire burrow or nest. This is not often possible due to counter airflows from other entrances into the borrow which may not be able to be located and sealed off.

As a result, while some previously devised animal and insect exterminators have proven effective at killing burrowing type animals and insects, the undesirable side effects associated with such exterminating devices nevertheless outweighs their advantages so as to limit the widespread use of such devices.

Thus, it would be desirable to provide an animal and insect exterminator which overcomes the problems associated with previously devised animal and insect exterminators. It would also be desirable to provide an animal and insect exterminator which is effective in exterminating burrowing-type animals and insects. It would also be desirable to provide an animal and insect exterminator which does not effect nearby people, animals, plants, crops, etc. Finally, it would be desirable to provide an animal and insect exterminator which can be easily and safely utilized.

SUMMARY OF THE INVENTION

There is disclosed herein a unique animal and insect exterminator which is effective in exterminating burrowing-type animals and insects. The exterminator includes an elongated tubular member having first and second opposed ends. A shatterable tip member is replaceably mounted on the first end of the tubular member and has an explosive charge, such as black powder or jellied methanol, disposed therein. A detonating means is carried by the tubular member for detonating the explosive charge and shattering the tip member.

The exterminator is adapted to be inserted into an underground burrow or nest such that the fragments of the tip member, when exploded, will be propelled throughout the burrow or nest.

In a preferred embodiment, the detonating means includes a primer which is mounted within the tip member in proximity with the explosive charge and a trigger means carried within the tubular member for forceably engaging the primer to cause its detonation.

The trigger means preferably includes a handle which is mounted exteriorly at the first end of the tubular member and which is secured to one end of a short length rod. The opposite end of the short length rod is threadingly fastened to a connector which is moveably mounted within the tubular member. An elongated rod having one end disposed in proximity with the second end of the tubular member to forceably engage the primer is slidingly carried within the connector member. First and second biasing means are provided for respectively biasing the connector away from the handle and the elongated rod towards the handle. The biasing means cooperate to prevent inadvertent movement of the elongated rod until the handle is urged away from the tubular member and released; at which time the inertia of the first biasing means or spring will be transferred through the connector member to the elongated rod causing the opposite end of the rod to extend outward beyond the end of the tubular member to forcibly strike and detonate the primer.

The animal and insect exterminator of the present invention overcomes many of the problems associated with previously devised animal and insect exterminators. The provision of a shatterable tip member which is shattered by an explosive charge contained within the tip member sends fragments of the tip member as well as fire and heat, pressure and concussion waves throughout the entire underground burrow or nest thereby effectively killing all of the animals or insects within the burrow or nest. The shatterable tip member may be quickly and easily replaced with a new tip member for subsequent reuse of the exterminator. In addition, as the tip member is exploded within the burrow or nest, damage or harm to nearby people, animals, plants or crops is eliminated thereby providing an exterminator which is safe in use.

BRIEF DESCRIPTION OF THE DRAWING

The various features, advantages and other uses of the present invention will become more apparent by referring to the following detailed description and drawing in which:

FIG. 1 is an elevational view of the animal and insect exterminator of the present invention;

FIG. 2 is a cross-sectional view, generally taken along line 2—2 in FIG. 1;

FIG. 3 is a cross-sectional view, generally taken along line 3—3 in FIG. 1; and

FIG. 4 is a pictorial view illustrating the use of the exterminator of the present invention in underground burrow.

DESCRIPTION OF THE PREFERRED EMBODIMENTS

Throughout the following description and drawing, identical reference numbers are used to refer to the same components shown in multiple figures of the drawing.

Referring now to the drawing, there is illustrated an exterminator 10 for use in exterminating animals and insects and, in particular, burrowing-type animals and insects, such as rabbits, gophers, prairie dogs, rats, ants, termites, hornets, etc.

As shown in FIGS. 1, 2 and 3, the exterminator 10 includes a tubular member 12 having an elongated form. Preferably, the tubular member 12 has a length of approximately 4 feet. The tubular member is illustrated as having a circular cross-section, a hollow interior and first and second opposed ends, 14 16 respectively. The tubular may be foreign of any suitable high strength metallic material such as aluminum.

As shown in FIG. 1, and in greater detail in FIG. 2, the exterminator 10 further includes a shatterable tip member 18 which is replacably mounted about the second and 16 of the tubular member 12. The tip member 18 is formed with a conical-shaped end portion 20 and a substantially straight sleeve portion 24 which is adapted to slidingly mount over the second end 16 of the tubular member 12.

The tip member 18 is formed with a hollow interior and is provided with an intermediate annular shoulder 26. Furthermore, the exterior ends of the sleeve portion 22 of the tip member 18 are provided with a plurality of circumferentially spaced lands or ribs 28. The lands or ribs 28 have a smoothly tapered configuration increasing in height from the outer end of the tip member 18. The lands or ribs 28 function to securly mount and center the tip member 18 on the second and 16 of the tubular member 12.

Preferably, the tip member is formed of any suitable material which is easily shatterable into small fragments. Preferably, a plastic material, such as polyvinylchoride, is utilized to form the tip member 18. Other materials, such as light weight metals, may also be employed.

As shown in FIG. 2, an explosive charge 30 is disposed within the interior of the tip member 18. The explosive charge 30 may be any conventional type of explosive, such as black powder, jellied methanol or gasoline, etc. The charge 30 is fitted within the interior of the tip member 18 approximately to the annular shoulder 26.

The exterminator 10 of the present invention further includes means for detonating the explosive charge 30 and thereby shattering the tip member 18. Preferably, the detonating means includes a primer means 32 and a trigger means denoted in general by reference number 34.

As shown in FIG. 2, the primer means 32 comprises a conventional fire arm cartridge primer cap which has a cylindrical configuration. A small amount of a highly sensitive explosive is disposed within the cap 32 which is detonated by being subjected to external force or a blow. The primer cap 32 is essentially mounted in an annular-shaped member 36 formed of a plastic, fiber, etc. The annular member 36 is formed with a reduced diameter end portion which forms an intermediate shoulder in the annular member 36 which engages and securely seats on the shoulder 26 in the tip member 18 to mount the primer 32 in close proximity with the explosive charge 30.

The trigger means 34 includes a handle mechanism which is disposed adjacent the first and 14 of the tubular member 12. The handle mechanism 40 includes a collar 42 which is securely mounted within the first end 14 of the tubular member 12. The collar 42 is provided with a centrally located recess or cavity 44 and central bore 46. A short length rod or shaft 48 is slidingly disposed through the bore 46 in the collar 42 and is connected at its upper end to a knob 50. The knob 50 fits within the recess 44 and the collar 42 and normally seats against the bottom surface 52 of the recess 44.

The opposite end of the short length rod 48 is secured, such as by threading, to a connector member 54 which is movably disposed within the tubular member 12. The connector 54 has a cylindrical configuration with first and second bores 56 and 58 respectively, extending through opposite ends thereof. A hollow cavity 60 is formed within the connector member 54. The first bore 56 is provided with internal threads for threadingly receiving the threaded end of the short length rod 48 as shown in FIG. 3. The second bore 58 in the connector member 54 slidingly receives an elongated rod 62.

The first end of the rod 62 is provided with an enlarged flattened end portion 64 which is disposed within the cavity 60 in the connector member 54. The opposite end of the rod 62, as shown in FIG. 2, is provided with a tapered point 66 which acts as a firing pin to forceably engage the primer 32, as described in greater detail hereinafter.

The trigger means 34 further includes a first biasing means 70, such as a coil spring, which biases the connector member 54 in a direction away from the collar 42. The biasing spring 70 is disposed about the short length rod 48 and seats at between on the interior end of the collar 42 and one end of the connector member 54 as shown in FIG. 3.

A second biasing means 72 is provided for biasing the elongated rod 62 towards the collar 42. The second biasing means 72 is in the form of a coil spring which is disposed about one end of the elongated rod 62 and seats between the interior of the opposite end of the connector member 54 and the enlarged end portion 64 of the rod 62. The biasing spring 72 functions to urge the enlarged end 64 of the rod 62 toward the opposite end of the connector member 54 and to maintain the enlarged end 64 in contact with the end of the connector memeber 54 throughout movement of the connector member 54 as described hereafter.

A guide member 76 is mounted within the second end 16 of the tubular member 12 as shown in FIG. 2. The guide member 76 is formed with a centrally located bore 78 which slidingly receives the elongated rod 62 therethrough. The guide member 76 functions to maintain the end of the rod 62 in a centrally located position within the interior of the tubular member 12 and to direct the pointed end 66 of the rod 62 towards the primer 32.

In use, a tip member 18 having a explosive charge 30 disposed therein is initially fitted over the second end 16 of the tubular member 12. The tubular member 12 is then inserted into a underground burrow or nest, as shown in FIG. 4, until the tip member 18 is located in the desired position within the interior of the burrow or nest.

In a normal, non-operative position, the knob 50 will seat against the bottom surface 52 of the recess 44 in the collar 42 to maintain the short length rod 48 and the connector member 54 in a fixed position within the interior of the tubular member 12. The elongated rod 62 is also held in a fixed position by means of the biasing spring 72 which urges the rod 62 towards the collar 42. In this position, the pointed end 66 of the elongated rod 62 is spaced a short distance away from the primer 32 in the tip member 18 as shown in FIG. 2.

If it is desired to detonate the exterminator 10 of the present invention, the knob 50 is grasped and pulled upward out of the recess 44 in the collar 42 against the biasing force of first spring 70. This upward movement causes the connector member 54, and the elongated rod 62 by means of the biasing spring 72 to also move in an upward direction, as viewed in the orientation illustrated in FIG. 3. When the knob 50 is released, it will move into engagement with the bottom surface 52 of the recess 44 in the collar 42 thereby bringing the knob 50, the short length rod 48 and the connector member 54 to a fixed, stationary position, as depicted in FIG. 3. However, the momemtum or inertia of the first spring 70 is transferred through the connector member 54 to the second spring 72 thereby causing the second spring 72 to compress after the short length rod 48 and the connector member 54 have reached a stationary position. This compression of the spring 72 will enable the elongated rod 62 to move a short distance away from the short length rod 48 so as to bring the pointed end 66 forcibly into contact with the primer 32 thereby detonating the primer 32. Detonation of the primer 32 will subsequently cause detonation of the explosive charge 30 within the tip member 18 thereby shattering the tip member 18 and causing fragments therefrom to be propelled with substantial force throughout the underground burrow or nest to exterminate any animals or insects inhabiting the burrow or nest.

Thus, there has been disclosed, a new and improved animal and insect exterminator which effectively kills all animals or insects inhabiting an underground borrow or nest. The exterminator of the present invention includes a shatterable tip member which contains an explosive charge which is selectively detonated to shatter the tip member and cause fragments therefrom as well as fire and heat, pressure and concussion waves to be propelled throughout the burrow or nest with substantial force. The exterminator of the present invention is uniquely configured to prevent inadvertent or accidental triggering or detonation of the explosive charge. This not only provides increased safety for use of the exterminator of the present invention but also insures a quick and consistent detonation of the explosive charge.

What is claimed:

1. An animal and insect exterminator comprising:
    a tubular member having first and second ends;
    a shatterable tip member replaceably mounted on the second end of the tubular member;
    an explosive charge disposed within the tip member; and
    primer means mounted within the tip member within proximity with the explosive charge;
    manually operable trigger means, carried by the first end of the tubular member and extending telescopically outward therefrom;
    an elongated rod slidably disposed within the tubular member forceably engaging the primer means upon urging of the manually operable trigger means;
    first means for biasingly positioning the elongated rod away from the primer means; and
    second means for biasingly urging the trigger means toward the elongated rod, the second biasing means extending a force opposed to and greater than the force exerted by the first biasing means.

2. The exterminator of claim 1 wherein the tip member is formed of a plastic material.

3. The exterminator of claim 1 wherein the explosive charge within the tip member is black powder.

4. The exterminator of claim 1 wherein the explosive charge within the tip member is jellied methanol.

5. An animal and insect exterminator comprising:
    a tubular member having first and second ends;
    a shatterable tip member replaceably mounted on the second end of the tubular member;
    an explosive charge disposed within the tip member;
    primer means mounted within the tip member in proximity with the explosive charge for detonating the explosive charge;
    manually operable trigger means, carried by the tubular member first end, for detonating the primer means;
    a connector member movably disposed within the tubular member;
    a knob mounted exteriorly on the first end of the tubular member;
    a first rod interconnecting the knob and the connector memeber;
    first biasing means for biasing the connector member away from the handle;
    a second elongated rod having first and second ends, the first end of the second rod being slidingly disposed within the connector member and the second end having a pointed configuration and disposed in proximity with the second end of the tubular member;
    second biasing means for biasing the first end of the second rod towards the knob; and wherein
    the first and second biasing means cooperate with the connector, knob and first and second rods to prevent movement of the second rod towards the second end of the tubular member until the knob, connector and first rod have been urged away from the first end of the tubular member and released.

* * * * *